Sept. 17, 1929.  E. S. STADELMAN  1,728,704
PULLEY
Filed Aug. 23, 1927
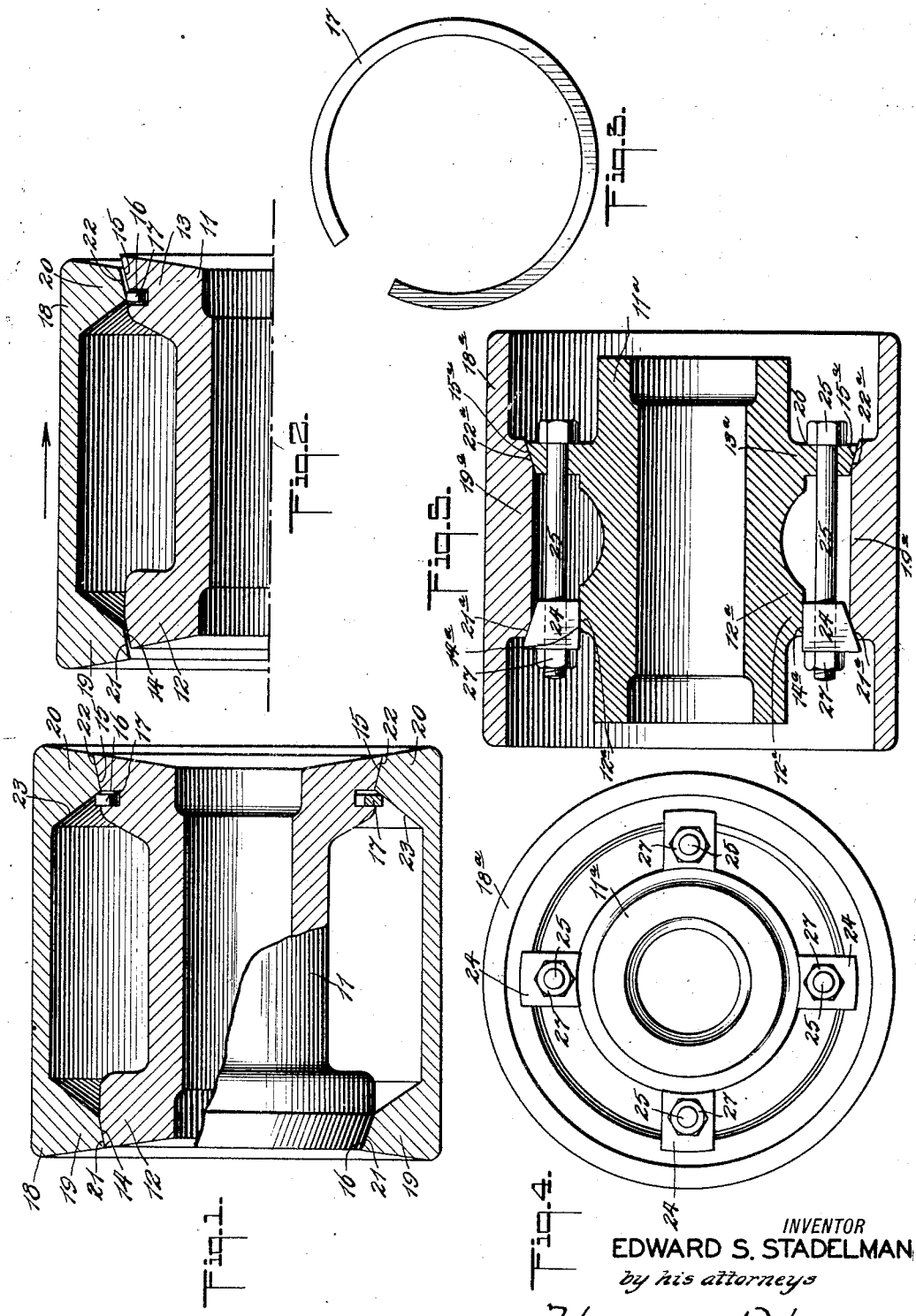
INVENTOR
EDWARD S. STADELMAN
by his attorneys
Howson and Howson

UNITED STATES PATENT OFFICE

EDWARD STEVENSON STADELMAN, OF NEWARK, NEW JERSEY

PULLEY

Application filed August 23, 1927. Serial No. 214,871.

My invention relates to pulleys, and more particularly to pulleys having rims which may be formed of harder and more durable material than that of the pulley hub.

Among the objects of my invention may be mentioned the provision of a pulley only a part of which need be replaced when the pulley is worn, providing means whereby a pulley rim and hub may be simply and easily connected and held in place, and providing such a pulley whose limited machined surfaces make its connection efficient and its manufacture inexpensive. Further objects will appear upon consideration of this specification.

In the present invention these objects have been attained by means of a construction and arrangement of parts which is illustrated in the accompanying drawings, wherein—

Figure 1 is an elevation, partly in section, of a hard metal rim and soft metal hub formed and connected in accordance with the invention, Fig. 2 is a partial section of the parts shown in Figure 1, the attachment not being completed, Fig. 3 is a view of the spring ring employed in one form of connection, Fig. 4 is an end view of a pulley constructed in accordance with the invention, wherein a modified form of connection is used, and Fig. 5 is a sectional view of the modification illustrated in Fig. 4.

In certain types of service it has been found that pulley rims wear out very quickly. For instance, in handling abrasive materials such as sand or coke with a belt conveyor supported on pulleys, abrasion of the pulleys has been found to be very rapid indeed. After a pulley rim has become worn down to a certain extent, it is necessary, for proper operation, that it be replaced. Simple pulleys are not expensive, and an entire pulley can be discarded and replaced by another at a comparatively insignificant cost.

Recently, however, anti-friction bearings (i. e., ball-bearings and roller bearings) have been used more and more extensively in pulleys, and replacing a pulley has become a more expensive proposition. The cost of manufacturing a hub containing the bearings is a considerable item.

Attempts to manufacture hubs of soft, easily formed metal and attachable rims of harder, more durable metal have not been altogether satisfactory. The difficulty of attaching the rims to the hubs, and the expense of machining the necessary surfaces on the hard metal rims for contacting with the hubs have made the use of such pulleys far from satisfactory. These drawbacks have been overcome by the present invention, one form of which is here illustrated by way of example.

In the drawings a pulley hub 11 has formed thereon two annular shoulders 12, 13 and on these shoulders beveled faces 14 and 15. Between these faces and adjacent the face 15 an annular groove 16 is formed in the hub. The faces or surfaces 14 and 15 have their bevels raked in the same direction, and the greatest diameter of the beveled surface 14 is smaller than the least diameter of the beveled surface 15, for a purpose which will later appear. In the annular groove 16 is fitted loosely a spring ring 17 whose maximum diameter is greater than that of the adjacent terminal edge of the beveled face 15.

A hollow cylindrical pulley rim 18 is formed with annular shoulders 19, 20 on its inside and beveled faces or surfaces 21 and 22 upon the annular shoulders. These beveled faces are designed to seat smoothly upon the beveled faces 14 and 15 respectively. It is evident that the least diameter of the beveled face 22 must be larger than the greatest diameter of the beveled face 14 in order that the pulley rim may be pushed upon the hub. The metal of the rim falls away rapidly from the inner edge of the beveled face 22, forming an interior beveled annular surface 23, whose purpose will be explained presently.

To assemble the pulley and rim, the rim is slipped over the pulley, the larger beveled face 22 on the rim passing easily over the smaller beveled face 14 on the hub. As the beveled face comes in contact with the spring ring 17 it compresses the ring within the groove 16 (see Fig. 2) and passes on over the ring. As the face 22 passes completely over the ring 17, and the faces 14 and 21, and 15 and 22 seat, the ring 17 expands out behind the interior beveled annular surface 23, which with its expansion keeps the ring in snug contact. The ring 17, lying in the groove 16, is likewise in contact with the hub, and thus prevents the rim from slipping back off of the hub in the opposite direction to that in which it is moved upon the hub.

When the rim is worn down so that it must be replaced it has but little value. Special provision therefore need not be required for removing the rim from the hub. When the rim is worn down to the point where it is useless it may be broken off of the hub. The hub and ring are not damaged by breaking the old rim off of the hub, and a new rim may be slipped over the hub in the manner which has just been described.

Instead of using a spring ring for preventing the rim from slipping off of the hub, bolts and wedges may be employed. Such an arrangement is illustrated in Figs. 5 and 6. In the modified construction a pulley hub 11$^a$ is provided with two annular shoulders 12$^a$ and 13$^a$ having surfaces 14$^a$ and 15$^a$ respectively machined thereon. A pulley rim 18$^a$ is provided with an annular shoulder 19$^a$ formed on the inside of the rim, upon which are machined two beveled surfaces 21$^a$ and 22$^a$. The annular shoulder 13$^a$ upon the pulley hub is provided with a plurality of holes through which bolts 25 may be projected. The annular surfaces 14$^a$ and 21$^a$ are held in contact with wedges 24 when the rim is attached to the pulley hub. The wedges 24 are held in place by having the bolts 25 thrust through holes provided in the wedges for the purpose; nuts 27 upon the ends of the bolts serving to tighten the wedges in place. It is thus seen that the rim may be easily and conveniently attached to the hub by means of the wedges 24, the bolts 25 and the nuts 27 upon the bolt ends.

By means of the present invention it is possible simply and easily to connect a pulley rim and hub and to hold the same in place. Limited machined surfaces suffice to provide the necessary bearing and thus give a sufficient connection at a low cost for machining the hard metal surfaces of the rim. The simplicity and economy of pulleys manufactured in accordance with the invention will be at once recognized by those skilled in the art.

I claim:

1. A pulley comprising a hub, and a cylindrical rim attachable thereto, in combination with a pair of narrow annular beveled faces machined on the inside of the rim and a corresponding pair of beveled faces machined on the hub, each pair of faces being adapted to seat upon the corresponding pair, and a spring ring adapted to hold said hub and said rim in engagement.

2. In a pulley, a hub, having a groove therein, and a cylindrical rim adapted to fit over said hub, in combination with a spring ring carried in the groove and projecting therefrom, said ring being adapted to prevent said rim from slipping off of said hub, substantially as described.

3. In a pulley, a hub, a cylindrical rim adapted to fit over said hub, a narrow annular beveled face machined on the inside of the rim, a corresponding face machined on said hub, and an annular groove adjacent the face on said hub, in combination with a spring ring carried in said groove adapted to prevent said rim from slipping off of the hub.

4. In a pulley, a hub, a cylindrical rim attachable thereto, a narrow annular beveled face machined on the inside of the rim, and a corresponding face machined on said hub, in combination with an interior beveled annular surface formed at an angle to the face on said rim, an annular groove adjacent the face on said hub, and a spring ring carried in said groove, adapted to engage with said beveled annular surface to hold said rim on said hub.

5. In a pulley, a hub having a groove therein, and a spring ring carried in and projecting from the groove, in combination with a cylindrical rim adapted to seat upon said hub having an interior beveled annular surface, said spring ring being adapted to bear upon the surface thus holding the rim against sliding off of the hub and making the contact tighter as the pulley is used, substantially as described.

In testimony whereof I have signed my name to this specification.

EDWARD STEVENSON STADELMAN.